(12) United States Patent
Phan et al.

(10) Patent No.: US 10,017,266 B2
(45) Date of Patent: Jul. 10, 2018

(54) POWER GENERATION AND DISTRIBUTION FOR VEHICLE PROPULSION

(71) Applicant: Top Flight Technologies, Inc., Malden, MA (US)

(72) Inventors: Long N. Phan, Somerville, MA (US); Luan H. Duong, Boston, MA (US); Samir Nayfeh, Shrewsbury, MA (US); Matthew Sweetland, Bedford, MA (US)

(73) Assignee: Top Flight Technologies, Inc., Malden, MA (US)

( * ) Notice: Subject to any disclaimer, the term of this patent is extended or adjusted under 35 U.S.C. 154(b) by 0 days.

(21) Appl. No.: 15/711,175

(22) Filed: Sep. 21, 2017

(65) Prior Publication Data

US 2018/0079516 A1 Mar. 22, 2018

Related U.S. Application Data

(60) Provisional application No. 62/398,464, filed on Sep. 22, 2016.

(51) Int. Cl.
*B64D 27/24* (2006.01)
*B64D 27/10* (2006.01)
*F01D 15/10* (2006.01)
*H02K 7/18* (2006.01)
*B64D 27/02* (2006.01)
*H02J 7/14* (2006.01)

(52) U.S. Cl.
CPC ............. *B64D 27/24* (2013.01); *B64D 27/10* (2013.01); *F01D 15/10* (2013.01); *B64D 2027/026* (2013.01); *F05D 2220/76* (2013.01); *H02J 7/1415* (2013.01); *H02K 7/1823* (2013.01)

(58) Field of Classification Search
CPC ... B64D 2027/026; B64D 27/24; F01D 15/10; F05D 2220/76; H02K 7/1823
See application file for complete search history.

(56) References Cited

U.S. PATENT DOCUMENTS

| 4,605,185 | A  | * | 8/1986  | Reyes ............... B64D 27/24 244/55 |
| 9,212,625 | B2 | * | 12/2015 | Shelley ............... F02K 5/00 |
| 9,248,908 | B1 | * | 2/2016  | Luyks ............... B64C 27/12 |
| 9,764,837 | B2 |   | 9/2017  | Phan et al. |
| 9,764,848 | B1 | * | 9/2017  | Vondrell ............. B64D 27/18 |
| 2010/0064689 | A1 | * | 3/2010 | Reinhardt ........... B64D 27/24 60/706 |
| 2010/0147993 | A1 |   | 6/2010 | Annati et al. |
| 2010/0219779 | A1 |   | 9/2010 | Bradbrook |

(Continued)

FOREIGN PATENT DOCUMENTS

WO WO 2012/004560 1/2012

OTHER PUBLICATIONS

U.S. Appl. No. 15/593,803, filed May 12, 2017, Phan et al.
(Continued)

*Primary Examiner* — Christopher P Ellis
(74) *Attorney, Agent, or Firm* — Fish & Richardson P.C.

(57) ABSTRACT

An aerial vehicle includes a hybrid power generation system comprising an engine; a generator mechanically coupled to the engine; and a propulsion system comprising an electric motor electrically coupled to the generator and a rotational mechanism coupled to the electric motor.

16 Claims, 12 Drawing Sheets

(56) References Cited

U.S. PATENT DOCUMENTS

| | | | |
|---|---|---|---|
| 2011/0046831 A1 | 2/2011 | Ananthakrishna | |
| 2011/0108663 A1* | 5/2011 | Westenberger | B64D 27/02 244/60 |
| 2013/0147204 A1* | 6/2013 | Botti | B64D 27/24 290/1 A |
| 2013/0184958 A1* | 7/2013 | Dyrla | B60K 6/00 701/99 |
| 2013/0227950 A1* | 9/2013 | Anderson | B64D 27/24 60/718 |
| 2014/0091172 A1 | 4/2014 | Arlton et al. | |
| 2014/0203739 A1* | 7/2014 | Chantriaux | B64C 27/14 318/139 |
| 2015/0148993 A1* | 5/2015 | Anton | B64D 27/24 701/3 |
| 2015/0151844 A1* | 6/2015 | Anton | B64C 31/024 244/55 |
| 2016/0023773 A1 | 1/2016 | Himmelmann et al. | |
| 2016/0200436 A1* | 7/2016 | North | B64C 29/0033 244/7 R |
| 2016/0257416 A1* | 9/2016 | Himmelmann | B64D 27/02 |
| 2016/0325629 A1* | 11/2016 | Siegel | B60L 11/12 |
| 2016/0355272 A1* | 12/2016 | Moxon | B64D 35/04 |
| 2017/0029131 A1* | 2/2017 | Steinwandel | B64D 35/08 |
| 2017/0057650 A1* | 3/2017 | Walter-Robinson | B64D 41/00 |
| 2017/0066531 A1* | 3/2017 | McAdoo | H02K 7/1815 |
| 2017/0101191 A1* | 4/2017 | Becker | B64D 27/18 |
| 2017/0137138 A9* | 5/2017 | Hunter | B64D 27/24 |
| 2017/0166316 A1* | 6/2017 | Zhou | B64D 27/24 |
| 2017/0190436 A1* | 7/2017 | Ullman | B64D 27/24 |
| 2017/0225573 A1* | 8/2017 | Waltner | B60L 11/14 |
| 2017/0225794 A1* | 8/2017 | Waltner | B64D 31/06 |
| 2017/0275009 A1* | 9/2017 | Huang | B64D 27/24 |
| 2017/0297727 A1* | 10/2017 | Niergarth | B64D 27/02 |
| 2017/0297728 A1* | 10/2017 | Niergarth | B64D 27/24 |
| 2017/0327219 A1* | 11/2017 | Alber | B64C 29/02 |

OTHER PUBLICATIONS

U.S. Appl. No. 15/594,255, filed May 12, 2017, Phan et al.
International Search Report and Written Opinion for App. Ser. No. PCT/US2017/052660, dated Nov. 30, 2017, 10 pages.

\* cited by examiner

POWER GENERATION AND DISTRIBUTION FOR VEHICLE PROPULSION

CLAIM OF PRIORITY

This application claims priority to U.S. Patent Application Ser. No. 62/398,464, filed on Sep. 22, 2016, the entire contents of which are incorporated here by reference.

BACKGROUND

Various types of engines can be employed in propulsion systems for vehicles such as land-based vehicles, aerial vehicles, etc. To reduce loss of generated energy, such engines are located near components that propel the vehicle forward. In airborne vehicles, an engine such as a combustion engine, etc. is located in the vicinity of propeller for which the engine is providing power. Along with limiting locations on the airborne for potentially positioning the engines, changing the performance of the propeller is controlled through changing the operating performance of the engine that drives the propeller.

SUMMARY

In an aspect, an aerial vehicle includes a hybrid power generation system comprising an engine; a generator mechanically coupled to the engine; and a propulsion system comprising an electric motor electrically coupled to the generator and a rotational mechanism coupled to the electric motor.

Embodiments can include one or more of the following features.

The rotational mechanism includes a propeller.

The rotational mechanism includes a fan.

The generator is configured to convert mechanical energy from the engine into electrical energy.

The electric motor is configured to convert the electrical energy from the generator into rotational mechanical energy.

The rotational mechanism is configured to be driven by the rotational mechanical energy from the electric motor.

The engine includes a combustion engine.

The propulsion system is located on a wing of the aerial vehicle and the hybrid power generation system is located on a body of the aerial vehicle.

The aerial vehicle includes multiple propulsion systems, each propulsion system including an electric motor electrically coupled to the generator and a rotational mechanism coupled to the electric motor.

Each electric motor is configured to operate independently of each other electric motor.

The aerial vehicle includes a battery electrically coupled to the generator and to the electric motor.

The aerial vehicle includes one or more of a sensing subsystem, a computing subsystem, and a communications subsystem electrically coupled to the generator.

In an aspect, a method includes, in a hybrid power generation system of an aerial vehicle: generating mechanical energy in an engine; and converting the generated mechanical energy into electrical energy in a generator mechanically coupled to the engine. The method includes, in a propulsion system of the aerial vehicle, converting the electrical energy into rotational mechanical energy to drive rotation of a rotational mechanism.

Embodiments can include one or more of the following features.

The method includes converting the electrical energy into rotational mechanical energy to drive rotation of a rotational mechanism in each of multiple propulsion systems of the aerial vehicle.

The method includes driving rotation of the rotational mechanism in each propulsion system independently of the rotation of the rotational mechanism in each other propulsion system.

The method includes driving rotation of a first rotational mechanism in a first direction and driving rotation of a second rotational mechanism in a second direction, the first direction different from the second direction.

The method includes driving rotation of a first rotational mechanism at a first speed and driving rotation of a second rotational mechanism at a second speed, the first speed different from the second speed.

The method includes storing at least some of the electrical energy in a battery.

The method includes providing at least some of the electrical energy to one or more of a sensing subsystem, a computing subsystem, and a communications subsystem.

These and other aspects, features, and various combinations may be expressed as methods, apparatus, systems, means for performing functions, program products, etc.

Other features and advantages will be apparent from the description and the claims.

DETAILED DESCRIPTION

We describe here the use of a distributed energy system to provide propulsion to a vehicle, such as an aerial vehicle (e.g., a manned or unmanned aerial vehicle). In a distributed energy system, an engine such as a combustion engine drives an electrical energy generator, which produces electrical energy that powers a propulsion system for propelling the vehicle (e.g., a propulsion system that drives one or more propellers of an aerial vehicle). In a distributed energy system, the engine does not need to be positioned close to the propulsion system (e.g., the engine can be located relatively remote from the propellers). Further, by generating electrical energy from the mechanical energy produced by the combustion engine and providing the electrical energy rather than the mechanical energy to the propulsion system, the operation of the engine is essentially decoupled from the operation of the propulsion system. As such, both the engine and the propulsion system may be operated efficiently (e.g., at optimum rotational speeds, which may be considerably different) and independently (e.g., the rotational speeds of the engine and the propellers may be changed independently of each other).

Figure 1:
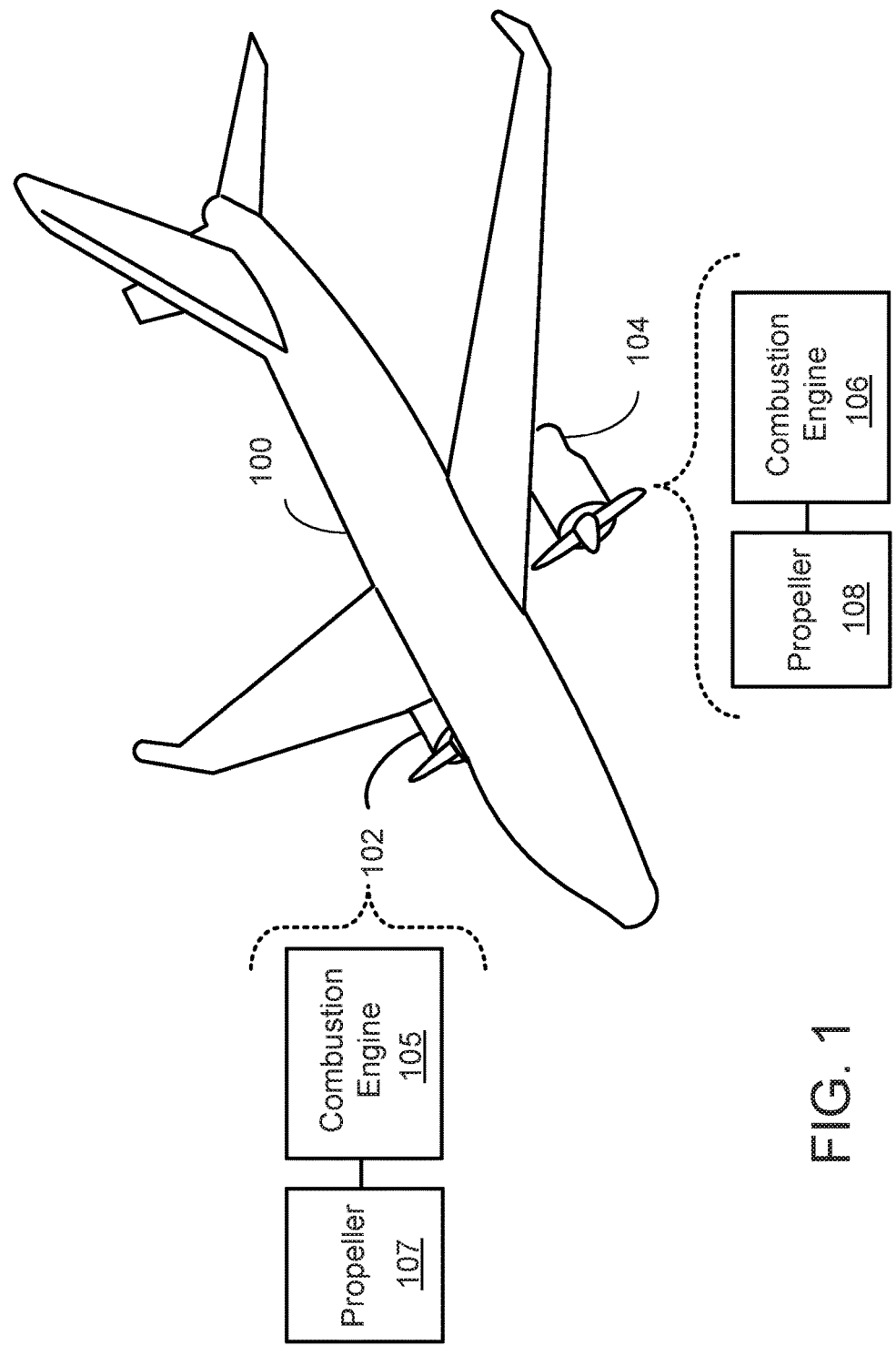
FIG. 1 is a diagram of an aerial vehicle.

Referring to FIG. 1, an aerial vehicle 100, such as a manned or unmanned aerial vehicle, includes a propulsion system that includes two propeller assemblies 102, 104. Each propeller assembly 102, 104 includes an engine 105, 106, such as an internal combustion engine, mechanically coupled to a propeller 107, 108, turbine fan, or other propulsion mechanism to provide forward thrust for flight. Internal combustions engines used in aerial vehicles 100 can take various forms, for example (but not limited to), two-stroke and four-stroke reciprocating engines (e.g., diesel engines, six-cylinder, eight-cylinder engines, etc.), Wankel engines, gas turbines, etc. In some arrangements, multiple engine types can be utilized for propelling the same vehicle.

Mechanical coupling techniques that can be used to couple the engine to the propulsion mechanism (e.g., a propeller, fan, etc.) include direct coupling between the engine and the propulsion mechanism, coupling techniques employing a transmission system (e.g., a mechanical gearbox, or other types of mechanical coupling. Mechanical coupling techniques constrain the combustion engine to operate at a fixed rotational speed relative to the rotational speed of the propulsion mechanism. For example, to increase the rotational speed of the propeller of an aerial vehicle (e.g., to gain altitude), the operating speed of the combustion engine is increased. Conversely, to reduce the rotational speed of the propeller, the operating speed of the combustion engine is reduced.

Direct coupling techniques can be considered relatively simple to implement and generally involve lightweight components. In addition, direct coupling techniques generally do not dissipate any of the mechanical power transmitted from the engine to the propulsion mechanism (e.g., propeller, turbine fan, wheel etc.). However, direct coupling techniques do call for the engine to rotate at a speed that depends on the rotational speed of the propulsion mechanism to which the engine is connected, which can lead to tradeoffs in system design. For example, gas turbines commonly operate most efficiently at a rotational speed of at least about 30,000 RPM, whereas propellers often operate most efficiently at lower rotation speeds, such as between about 2000 rpm and about 4000 rpm. To enable the gas turbine and the propellers to both operate close to their efficient rotational speeds, a transmission mechanism such as a gearbox can be employed to reduce the rotational speed of the engine to the rotational speed for the propulsion mechanism. In an example, for designs in which a gas turbine is used to drive a propeller (e.g., a turbofan configuration), a gearbox can be used to implement a gear reduction of ten or more to adjust the initially generated rotation speed (e.g., 30,000 rpm of the gas turbine) to the rotation speed for the propeller (e.g., 2000-4000 rpm). However, transmission mechanisms (e.g., gearboxes) can be heavy, and thus the use of a transmission mechanism adds to the weight of the vehicle. In addition, transmission mechanisms often dissipate some of the power generated by the engine and can be subject to possible failures. Furthermore, even when the combustion engine and propulsion mechanism (e.g., propeller or fan for an aerial vehicle) are matched to efficiently operate under a given set of operating conditions using a direct coupling, a gearbox, etc., the engine and propulsion mechanism may not be able to operate as efficiently under a different set of operating conditions, e.g., operating conditions that may be encountered during a mission of the vehicle. In addition, the rate at which the propulsion mechanism can change its rotational speed or other operating parameters, e.g., in response to changing operating conditions encountered during a mission, is limited by the rate at which the rotational speed or other operating parameters of the engine can change.

Mechanical coupling of the engine to the propulsion mechanism can also limit the design aspects of the propulsion system and, more generally, the design aspects of the vehicle (e.g., the aerial vehicle 100). For example, as shown in FIG. 1, mechanical coupling (e.g., direct coupling or coupling via a transmission mechanism) between the combustion engine 106 and the propeller 108 calls for the combustion engine 106 to be located near the propeller 108. A design employing a single combustion engine to provide power to multiple propellers which are positioned at different locations may be difficult to implement. Further, location of the engine near the propeller can make it difficult to mechanically isolate the engine 106 from the frame of the propeller assembly 104 and from the structure of the aerial vehicle 100, which in turn makes it challenging to reduce vibration, engine sounds, etc.

In some aerial vehicles, having two or more propellers operate in opposite directions can be advantageous. However, to drive the propellers in opposite directions, the combustion engine, gearbox, transmission, etc. for each propeller may have a different configuration, which can complicate the design of the vehicle (e.g., by increasing the number of system components), lead to a larger vehicle maintenance burden, etc.

Figure 2:
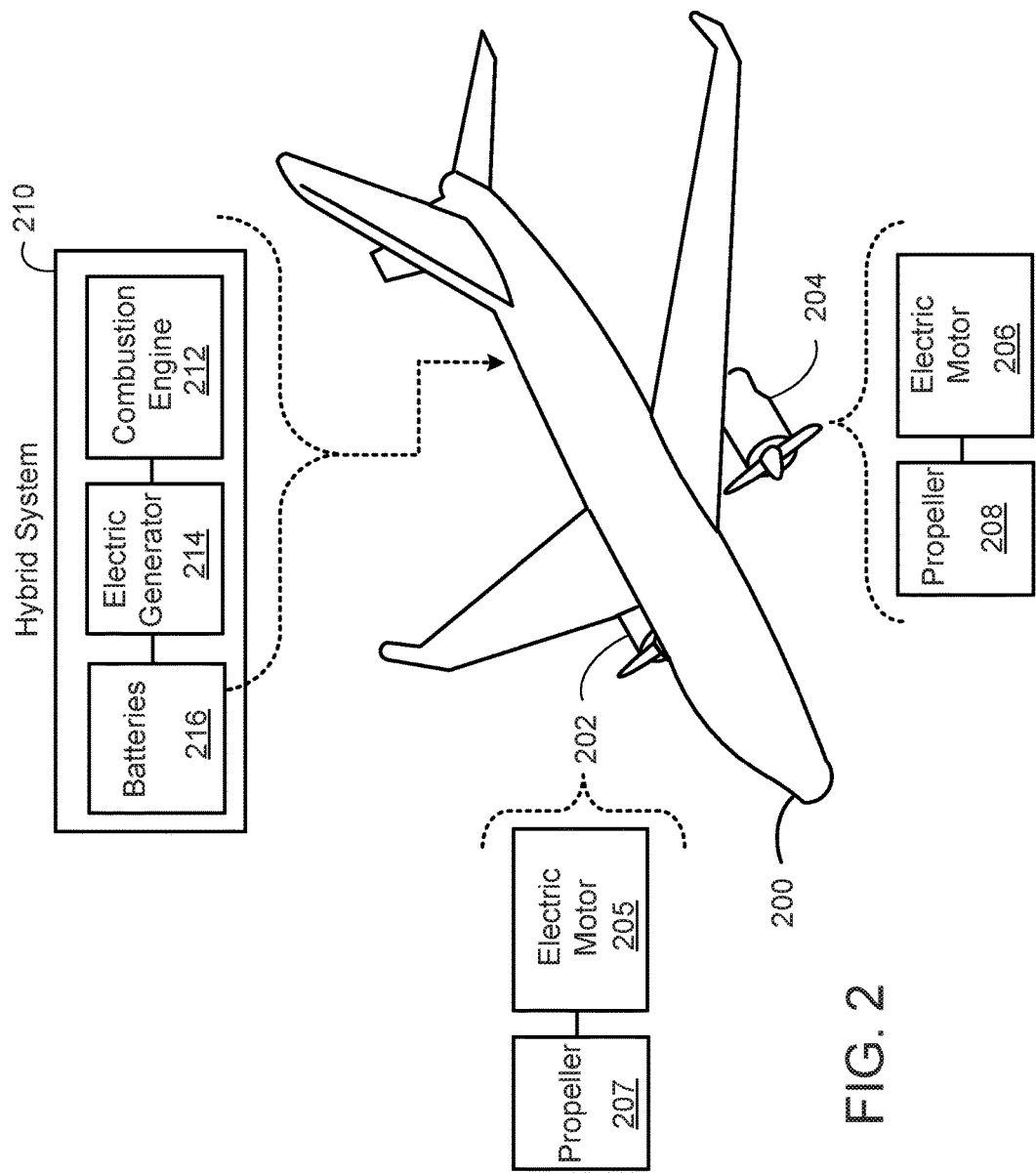
FIG. 2 is a diagram of an aerial vehicle that employs a distributed energy system.

Referring to FIG. 2, an aerial vehicle 200, such as a manned or unmanned aerial vehicle, includes a distributed energy system. The distributed energy system includes a propulsion system that includes two propeller assemblies 202, 204 and a hybrid energy generation system 210. Each propeller assembly 202, 204 includes a propeller 207, 208 that is driven by an electric motor 205, 206, respectively. The electric motors 205, 206 are powered by electrical energy generated by the hybrid energy generation system 210. The hybrid energy generation system 210 includes an engine 212, such as a combustion engine, that is directly coupled to an electric generator 214. The generator 214 generates alternating current (AC) power from the mechanical power generated by the engine 212. The AC power generated by the generator 214 can be used to provide electrical power to the electric motors 205, 206 in the propeller assemblies 202, 204, which in turn drive rotation of the propellers 207, 208.

In the distributed energy system implemented in the aerial vehicle 200 of FIG. 2, the engine 212 is not mechanically coupled to the propulsion system (e.g., to the electric motors 205, 206 that drive the propellers 207, 208), but rather is electrically coupled to the motors 205, 206. As a result, many of the challenges associated with mechanical coupling between an engine and a propulsion system are obviated. For instance, without mechanical coupling between the engine 212 and the propulsion system, the rotational speed of the engine 212 does not need to remain relative to the rotational speed of the propulsion system. Thus, both the engine 212 and the propellers 207, 208 can be designed independently to operate at an efficient rotational speed, even if those rotational speeds are significantly different from one another. Furthermore, the rotational speed of the engine 212 does not need to be adjusted to adjust the rotational speed of the propellers 207, 208. As a result, the rotational speed of the propulsion system can be changed quickly, e.g., to effect a change in altitude or in response to changing operating conditions during a mission, and operation of the engine 212 can be maintained at an efficient rotational speed regardless of the load on the propulsion system.

The use of an engine 212 that is not mechanically coupled to the propulsion system can also reduce the weight of the aerial vehicle, leading to better fuel efficiency. For instance, the power generated by an engine is proportional to the rotational speed of the engine (power=torque*rpm). Thus, a small engine operating at a high rotational speed can be used deliver sufficient power to drive the propulsion system while adding less weight onto the aerial vehicle. In addition, the absence of mechanical coupling between the engine 212 and the propulsion system means that complex and heavy mechanical transmission systems, such as gearboxes, are not necessary. Rather, energy can be efficiently transferred from the engine 212 to the propulsion system as electrical energy over lightweight and less complex electrical components.

In some examples, the hybrid energy generation system 210 can include one or more batteries 216, such as rechargeable batteries, that can store at least some of the electrical energy generated by the electric generator 214. For instance, the electric generator 214 can be coupled to a rectifier, such as a bridge rectifier, that converts the AC output of the generator 214 into direct current (DC) power that is provided to the batteries 216. The energy stored in the batteries 216 can be used to provide additional electrical power to the electric motors 205, 206, e.g., in response to sudden demands for power that may occur during flight, to enable safe operation and landing in the event of a failure of the engine 212, generator 214, or another component of the hybrid energy generation system 210, or for other purposes. The role of the batteries 216 as a backup power source eliminates the need for a secondary power unit or piggyback generator set, and thus the aerial vehicle can be made lighter and with fewer components to maintain. In some examples, the batteries can be lithium polymer batteries, e.g., batteries with between 6 and 12 cells and a charge of between about 16,000 mAh (milliAmp-hours) and about 22,000 mAh. The size and charge of the batteries can depend on factors such as flight parameters, expected environmental conditions, mission tasks, or other factors. In some examples, the batteries 216 can enable the aerial vehicle 200 to fly with the engine 212 turned off, e.g., to enable silent or stealth operation, discussed further below.

Further description of an example hybrid energy generation system is provided in U.S. patent application Ser. No. 14/942,600, filed on Nov. 16, 2015, the entire contents of which are incorporated here by reference.

The engine 212 can be mounted on the chassis or airframe of the aerial vehicle 200 using resilient mounts to isolate the chassis or airframe from engine vibrations and/or engine noise. This isolation can decrease the vibratory stresses on the chassis or airframe, mitigate the impact of vibrations on the instrumentation and/or payload of the aerial vehicle 200, lessen the exterior and interior sound radiated from the airframe, and increase the comfort of pilots or passengers (for manned aerial vehicles).

Although the description here refers to aerial vehicle, such as manned or unmanned aerial vehicles (e.g., fixed wing or multi-rotor UAVs), the distributed energy system described here can be used to provide power to propulsion systems for land-based vehicles (e.g., manned or unmanned automobiles, bicycles, etc.), marine-based vehicles (e.g., unmanned ships, unmanned underwater vehicle (UUV)), or other types of vehicles. For instance, for land-based vehicles, the hybrid energy generation system can be used to provide power to an electric motor that drives one or more wheels or another mechanism that provides torque for forward motion.

Figure 3:
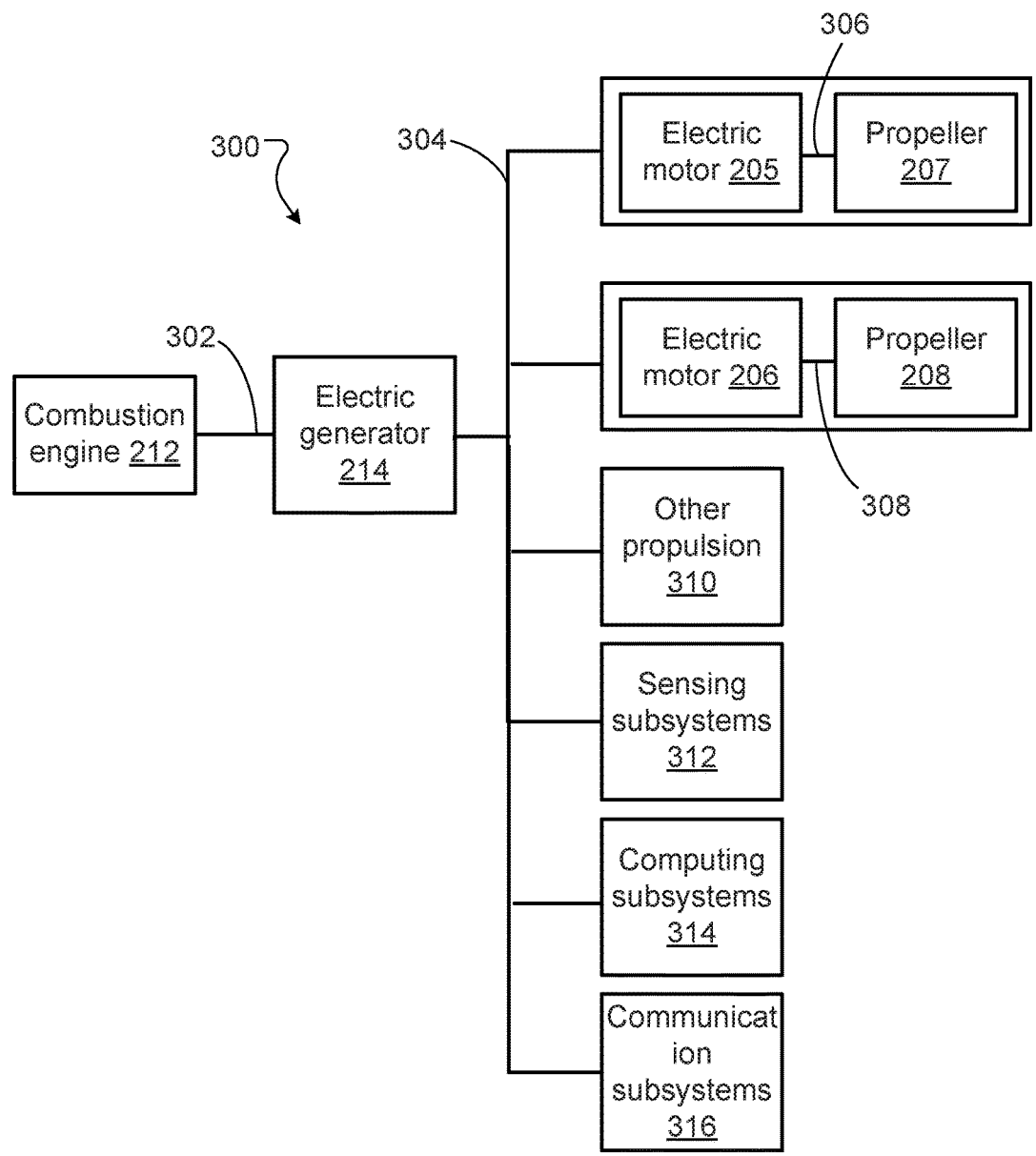
FIG. 3 is a block diagram of distributed energy system.

FIG. 3 is a diagram of a distributed energy system 300 of an aerial vehicle (e.g., the aerial vehicle 200 of FIG. 2).

Within the hybrid energy generation system 210, the engine 212 (e.g., the combustion engine) is mechanically coupled to the electric generator 214 via a mechanical coupling 302, such as a direct mechanical coupling. The generator 214 is coupled to the propeller assemblies 202, 204, via an electrical coupling 304, such that the electrical energy generated by the generator 214 can be used to power the propeller assemblies 202, 204. Within each propeller assembly 202, 204, the motor 205, 206 converts the electrical energy back into mechanical energy, which is provided across a mechanical coupling 306, 308 to drive the corresponding propeller 207, 208.

As discussed above, the presence of an electrical coupling 304 rather than a mechanical coupling between the hybrid energy generation system 210 and the propeller assemblies 202, 204 enables both the engine 212 and the motors 205, 206 to be run with efficient operating characteristics that can be set independently of each other. For instance, the engine 212 can be operated at a high rotational speed while the motors 205, 206 can be operated at a much lower rotational speed without requiring a complex and heavy mechanical transmission system. Furthermore, the electrical coupling 304 allows each motor 205, 206 to be operated independently of the other motor, enabling the motors 205, 206 to be operated at different rotational speeds or with differing other parameters or even in opposite directions.

The hybrid energy generation system 210 can also provide power to other types of propulsion mechanisms 310 on the same aerial vehicle. For instance, in addition to powering the propeller assemblies 202, 204, the hybrid energy generation system 210 can also power a fan or another type of propulsion mechanism.

In some examples, the hybrid energy generation system 210 can be used to provide power to other subsystems of the aerial vehicle. For instance, the hybrid energy generation system can provide power through the electrical coupling 304 to sensing subsystems 312, computing subsystems 314, communications subsystems 316, or other subsystems without the need for a dedicated electrical power unit for these subsystems. The use of the hybrid energy generation system to power other subsystems of the aerial vehicle enables the aerial vehicle to be smaller and lighter, thus improving fuel efficiency and performance.

In some examples, the aerial vehicle can implement regenerative soaring. When the aerial vehicle is in flight, the engine can be deactivated, e.g., to operate the aerial vehicle in stealth mode (discussed further below). The free spinning propellers can then be used as a turbine to recharge the batteries. Similarly, the propellers can also recharge the batteries when to aerial vehicle encounters an updraft.

Figure 4:
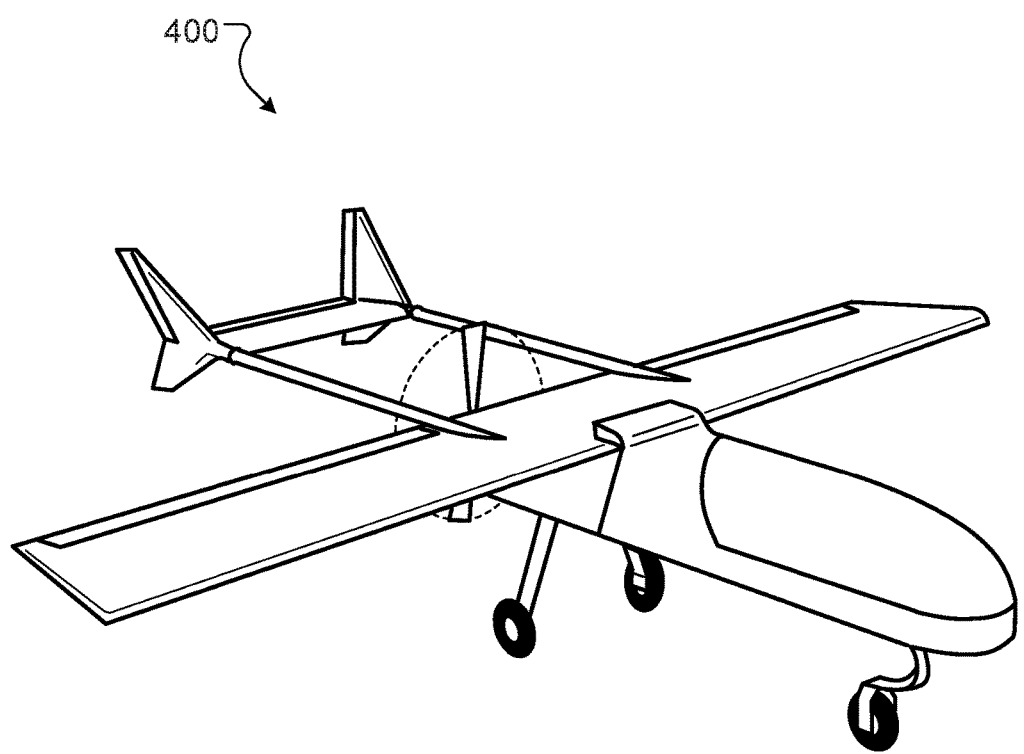
FIG. 4 is a diagram of an unmanned aerial vehicle (UAV).
Figure 5:
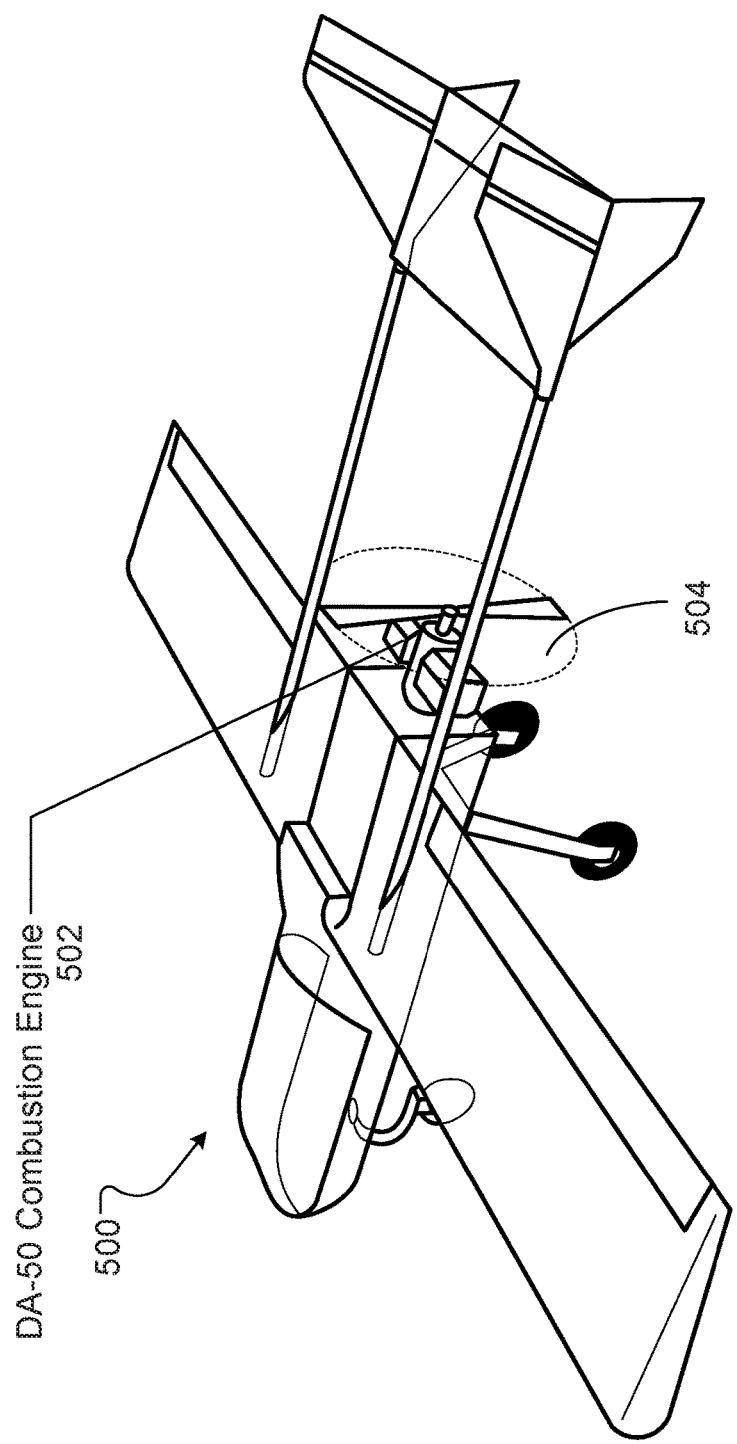
FIG. 5 is a diagram of a single propeller UAV that employs a combustion engine.

Referring to FIG. 4, an example of a fixed wing unmanned aerial vehicle (UAV) 400 is a Mugin 3 m UAV with the following specifications:
  Wing span: 3 m
  Length: 25 m
  Maximum endurance with a combustion engine: 3 hours (consumes 6 liters of fuel)
  Maximum take-off weight: 25 kg
  Maximum payload weight: 8 kg
  Empty weight: 8 kg
  Cruise speed: 55 mph (88.5 km/h)
  Fuel energy density: 12,888 Watt-Hour/kg Referring to FIG. 5, in an example, a UAV (e.g., the Mugin 3 m UAV with the specifications given for the UAV 400 of FIG. 4) can be configured as a UAV 500 that is powered by a combustion engine 502 mechanically coupled to a propeller 504. In this example, a DA-50 combustion engine (Desert Aircraft, Tucson, Ariz.) is used as the combustion engine 502 and the propeller 504 is a 22×8 propeller. Other types of combustion engines and/or propellers can also be used.

Specifications of operating parameters for the combustion engine powered UAV 500 are given in Table 1. The fuel weight was calculated at 0.77 kg/L and the total energy from fuel was calculated at 12,888 Watt-Hour/kg.

Figure 6:
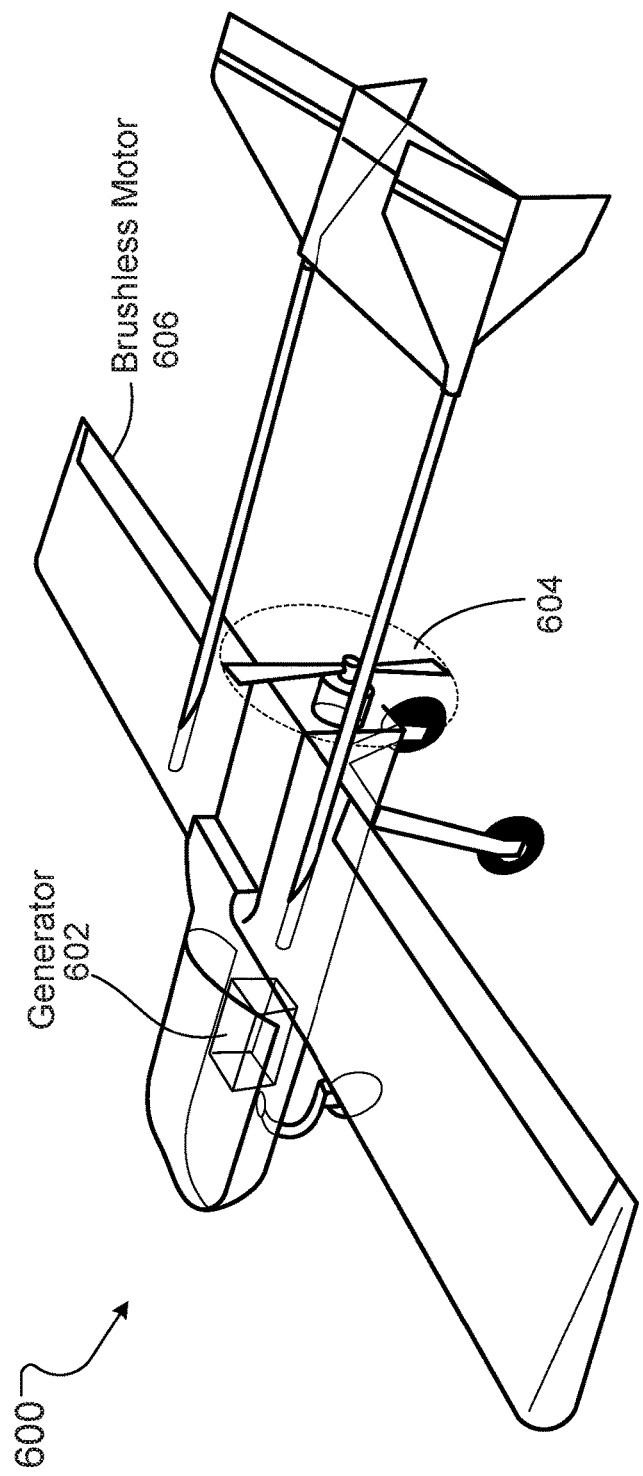
FIG. 6 is a diagram of a single propeller UAV that employs a distributed energy system.

Referring to FIG. 6, in an example, the same Mugin 3 m UAV (e.g., with the specifications given for the UAV 400 of FIG. 4) can be configured as a UAV 600 with a distributed energy system. The distributed energy system includes a combustion engine (not shown) and an electric generator 602 electrically coupled to a brushless motor 606 that drives a propeller 604. In this example, the engine is a Zenoah® G290RC 3.5 HP engine (Husqvarna Zenoah Co. Ltd., Saitama, Japan), the generator and propulsion motor are both a Turnigy® RotoMax 1.60 Brushless Outrunner Motor, the battery is a 6S 16000 mAh Lipo battery, and the propeller is a 22×8 propeller. Other types of engines, generators, motors, batteries, and/or propellers can also be used.

Specifications of operating parameters for the example UAV 600 are given in Table 1. The total energy from the battery was calculated as 3.7 Volts*6*16 Amps-Hour*0.9=320 Watt-Hour at 90% discharge. The total available energy from the battery and the hybrid energy generation system was calculated as the sum of the total energy from the battery and 0.12 times the total energy from the fuel. The factor of 0.12 accounts for the 12% energy conversion efficiency of the hybrid energy generation system. The flight time was calculated as the total available energy divided by the energy consumption rate of the motor at a cruising speed of 88.5 km/hour. Other parameters were calculated as described above.

Compared to the combustion engine powered UAV 500, the distributed energy system powered UAV 600 is lighter (e.g., because less fuel is carried) and has a longer flight time with correspondingly longer range.

Figure 7:
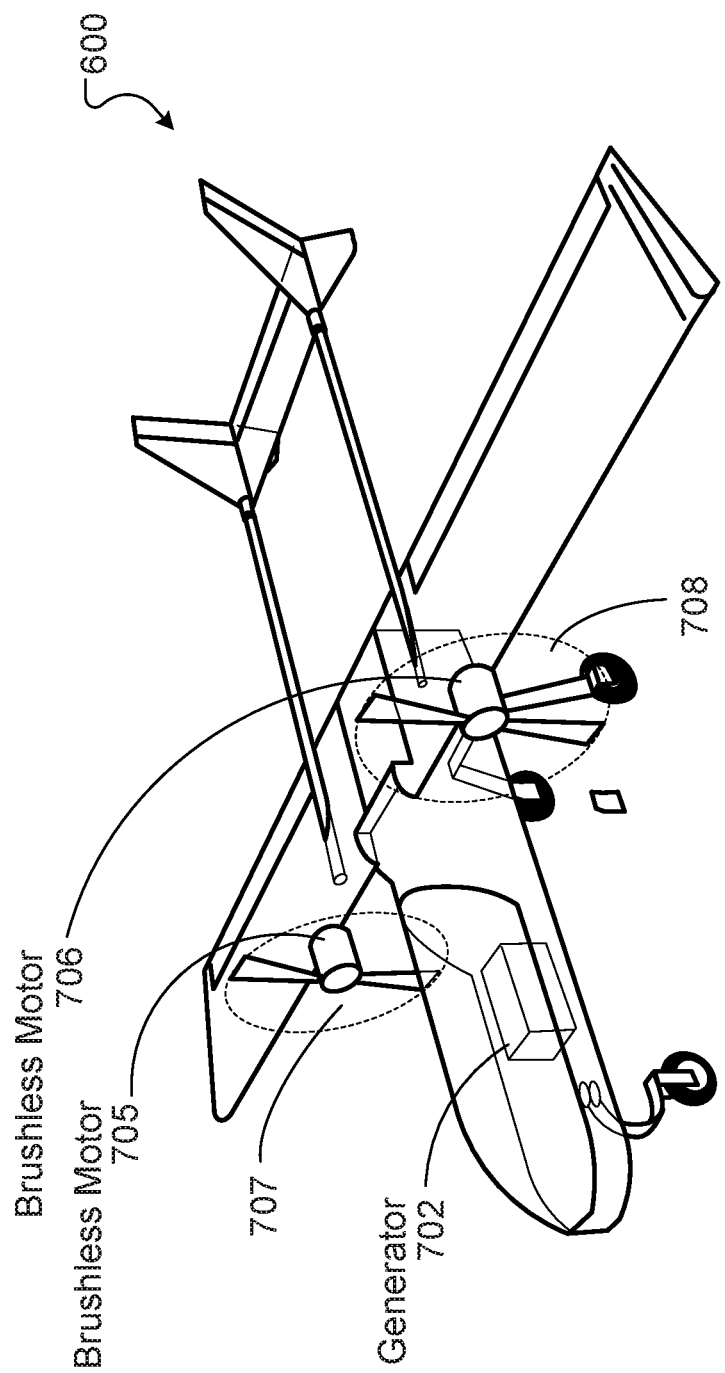
FIG. 7 is a diagram of a multi-propeller UAV that employs a distributed energy system.

Referring to FIG. 7, in an example, the same Mugin 3 m UAV (e.g., with the specifications given for the UAV 400 of FIG. 4) can be configured as a UAV 700 with a distributed energy system. The distributed energy system includes a combustion engine (not shown) and an electric generator 702 and is electrically coupled to two brushless motors 705, 706 each of which drives a corresponding propeller 707, 708. In this example, the engine is a Zenoah® G340RC 34 cc engine, the generator is a Hacker Motor Q80-4L Brushless motor (Hacker Motor GmbH, Ergolding, Germany), the propulsion motors are Turnigy® RotoMax 1.60 Brushless Outrunner Motors, the battery is a 6S 16000 mAh Lipo battery, and each propeller is a 22×8 propeller. Other types of engines, generators, motors, batteries, and/or propellers can also be used. Specifications of operating parameters for the example UAV 700 are given in Table 1.

The combustion engine powered UAV 500 and the distributed energy system powered UAV 700 have the same total take-off weight, yet the range and flight time of the hybrid energy generation system powered UAV 700 are more than double the range and flight time of the combustion engine powered UAV. This difference in range and flight time is due, e.g., to the additional energy provided by the hybrid energy generation system.

TABLE 1

Operating parameters for the combustion engine powered UAV 500 and the distributed energy system powered UAVs 600, 700.

|  | Combustion engine powered UAV 500 | Distributed energy system powered UAV 600 | Distributed energy system powered UAV 700 |
| --- | --- | --- | --- |
| Fuel | 6 L gasoline | 3.9 L gasoline | 9.5 L gasoline |
| Fuel weight | 4.620 kg | 3.003 kg | 7.315 kg |
| Total energy from fuel | 59,543 Watt-Hour | 38,072 Watt-Hour | 94275 Watt-Hour |
| Total energy from battery | N/A | 320 Watt-Hour | 320 Watt-Hour |
| Take-off weight | 25 kg | 20.7 kg | 25 kg |
| Motor power consumption at cruising speed | N/A | 1120 Watts | 1716 Watts |
| Total available energy |  | 4964 Watt-Hours | 11633 Watt-Hours |
| Flight time | 3 hours | 4.432 hours | 6.779 hours |
| Range | 266 km | 392 km | 600 km |

Distributed energy system powered UAVs can have multiple modes of operation, such as silent mode and glide mode. In silent mode, the UAV can operate on battery power over an area of interest, allowing the engine to be idled or deactivated to reduce the noise and heat signature of the UAV. In glide mode (sometimes also referred to as stealth mode), the UAV can glide over an area of interest with the engine idled or deactivated and no power being provided to the electric motors of the propulsion mechanism. Operation in silent mode or glide mode enables the UAV to be deployed, e.g., for surveillance missions.

Figure 8:
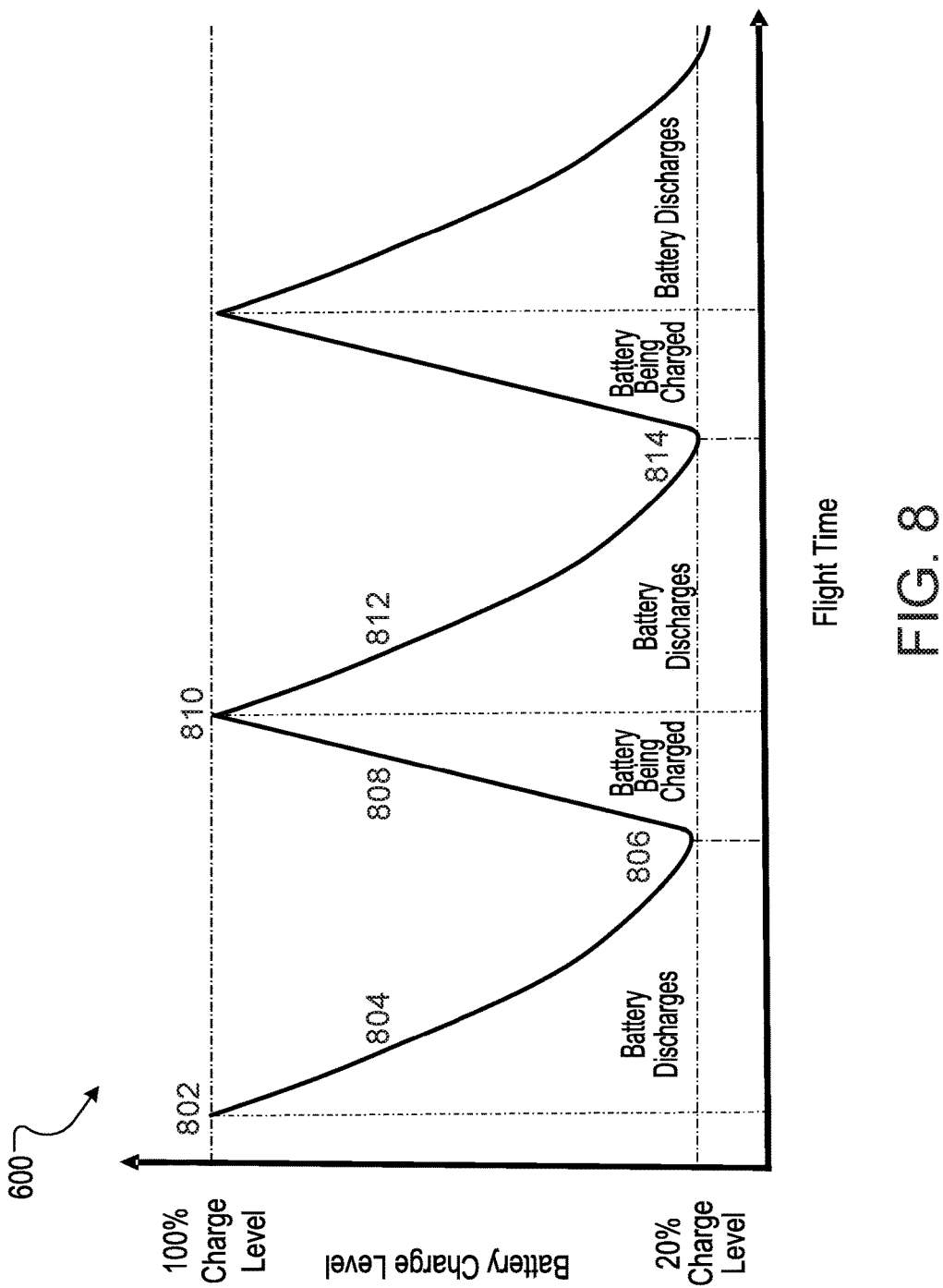
FIG. 8 is a chart of battery charge level versus flight time.

Referring to FIG. 8, in silent mode, the UAV can begin its mission at take-off with both the combustion engine and the electric motor(s) of the propulsion system operating. As the mission proceeds, some of the electric power generated by the generator is used to power the electric motors, and some of the electric power generated by the generator is sent to the batteries for storage. When the UAV reaches cruising altitude, the batteries are fully charged, as shown at point 802 on a battery charge level plot 800.

During flight, the combustion engine can be idled or deactivated, and the electric motors coupled to the propellers can receive electric power from the batteries. As the batteries provide power to the electric motors, the batteries discharge, shown as region 804 on the battery charge level plot 80. When the charge level of the batteries declines to a predetermined level (e.g., 10%, 20%, 30%, 40%, 50%, or another charge level), shown at point 806, the combustion engine can be reactivated. The activated combustion engine can both provide power to the electric motors and recharge the batteries, shown as region 808.

The combustion engine can be deactivated (shown as point 810) when the UAV gets close to an area of interest for its mission, such as an area within which silent mode operation is desired. Deactivating the combustion engine reduces the noise level and the temperature of the UAV, thus helping the UAV to avoid sound and/or heat detection sensors. With the combustion engine deactivated, the batteries provide power to the electric motors (shown as region 812) as the UAV flies within or near the area of interest. When the charge level of the batteries declines to a pre-determined level, shown at point 814, the UAV can exit the area of interest and the combustion engine can be reactivated to recharge the batteries. This cycle can be repeated multiple times, e.g., until the mission has been completed, until the fuel for the combustion engine is nearly used up, etc.

Figure 9:
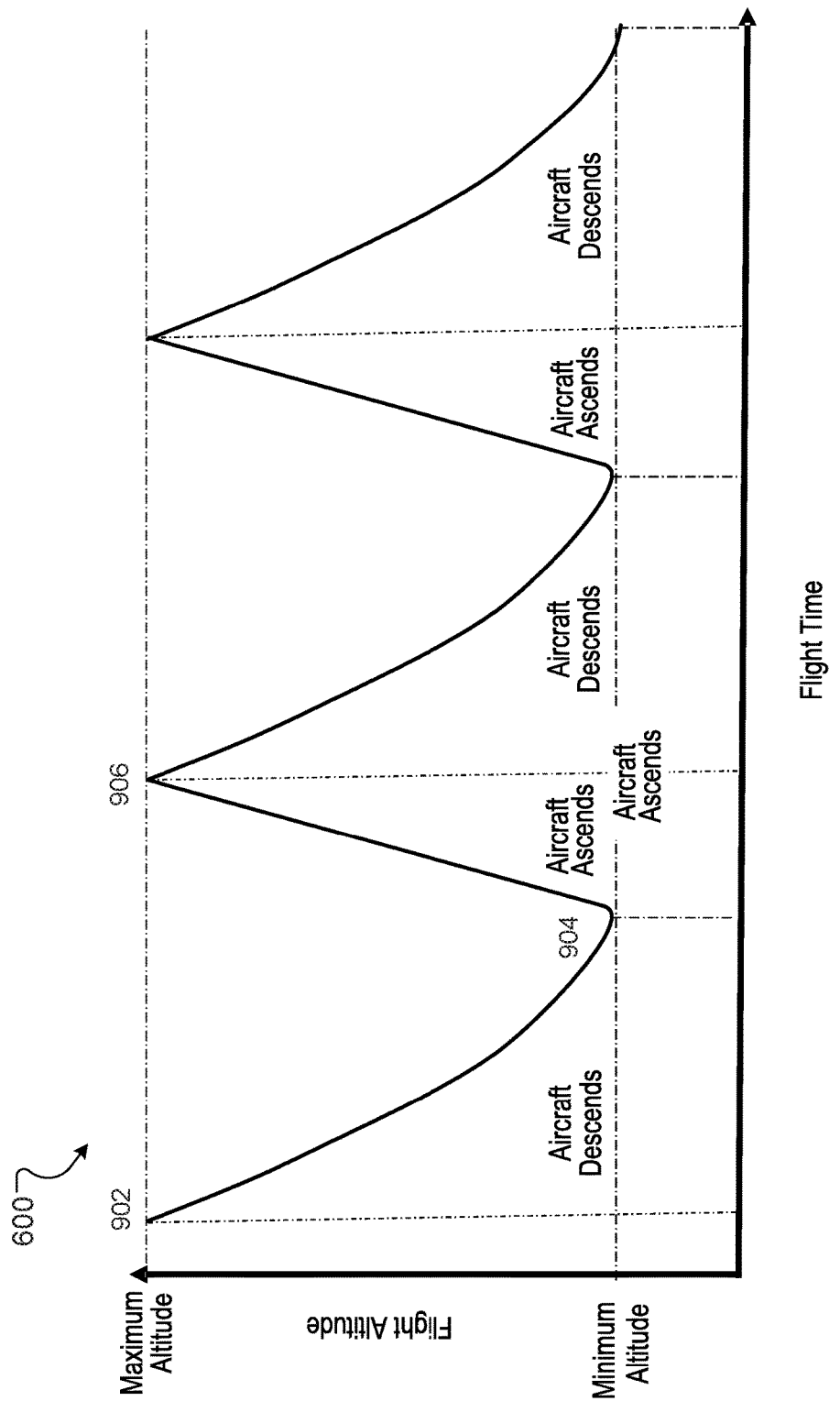
FIG. 9 is a chart of UAV altitude versus flight time.
Figure 10A:
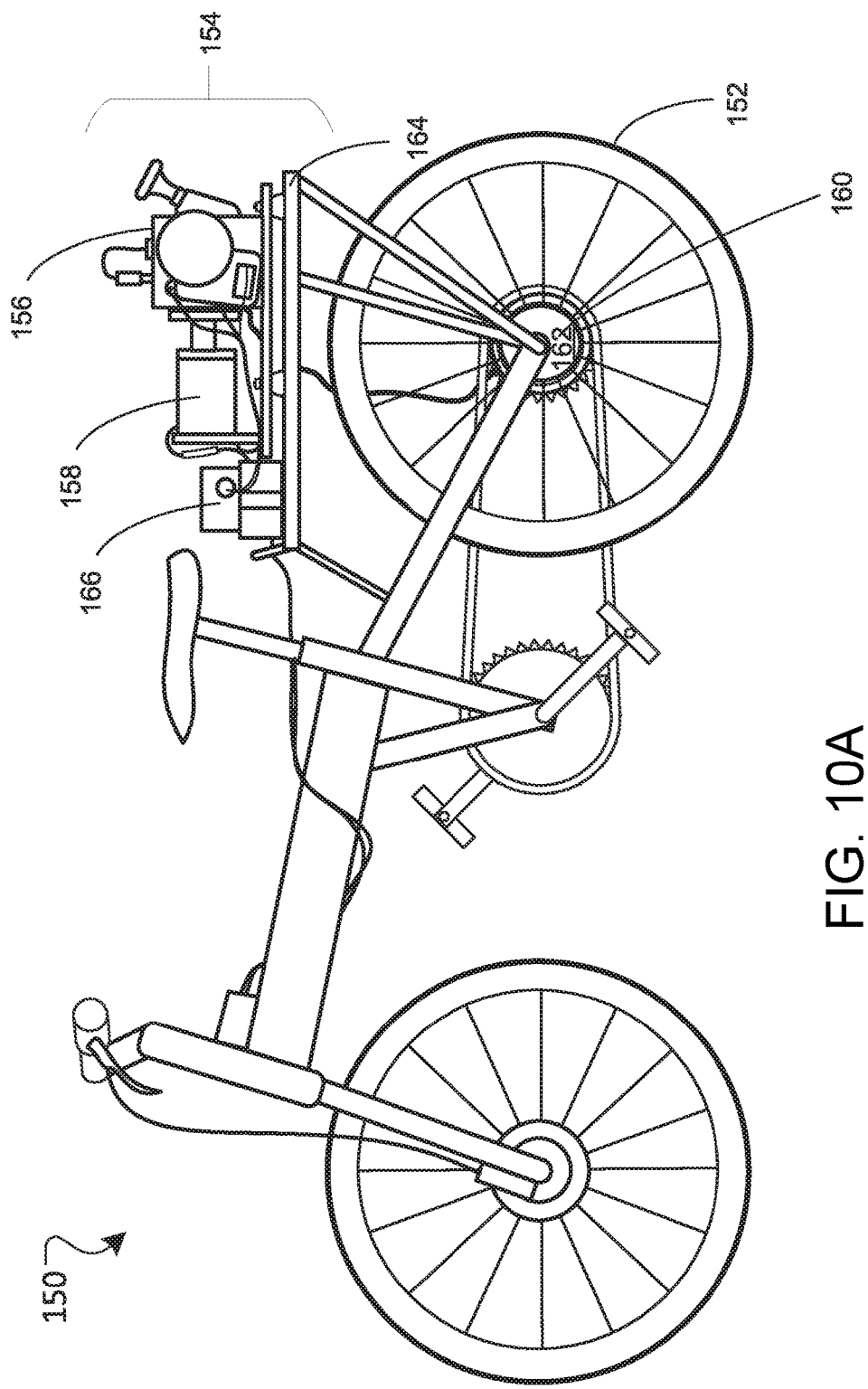
Figure 10B:
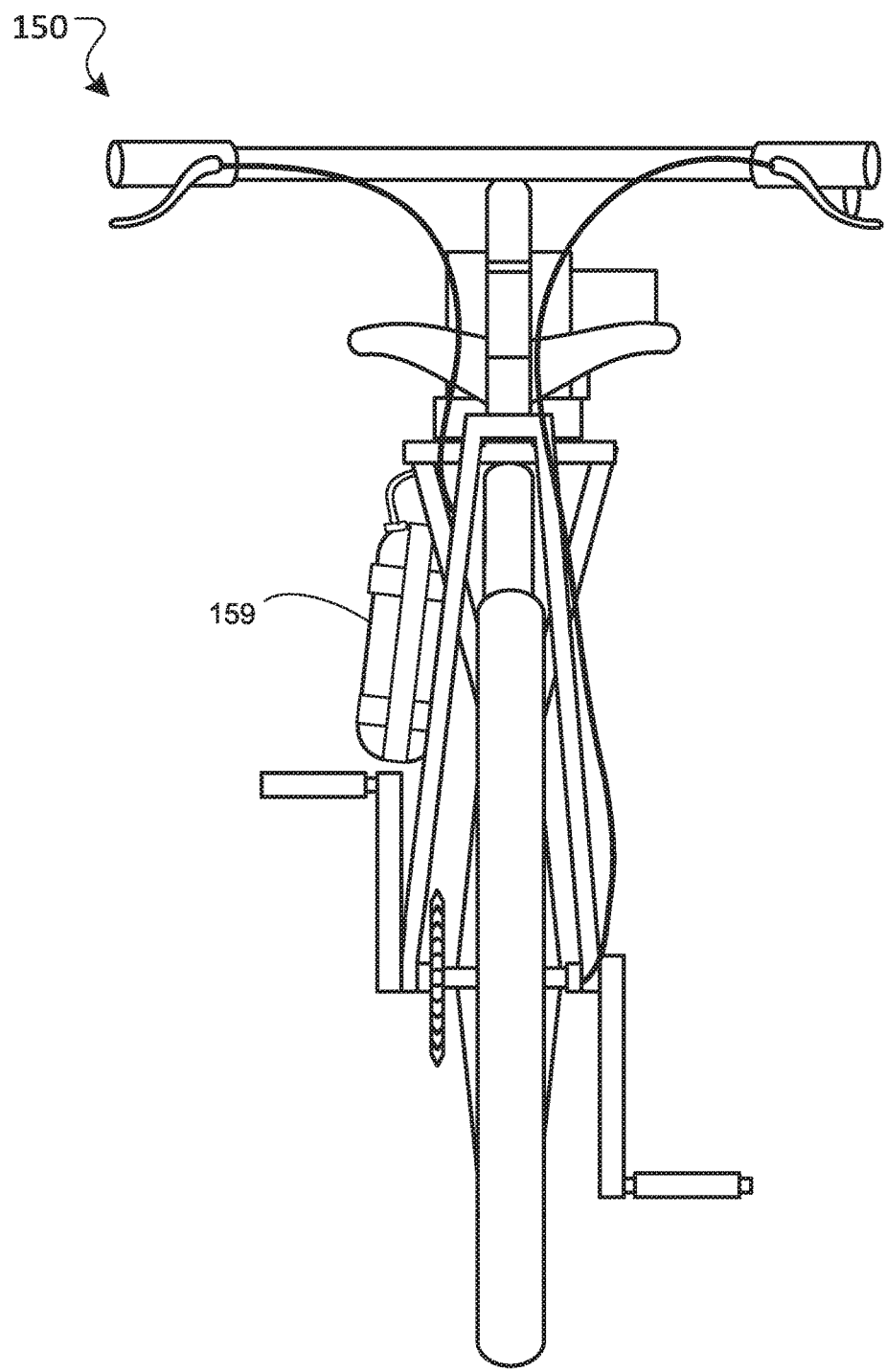
Figure 10C:
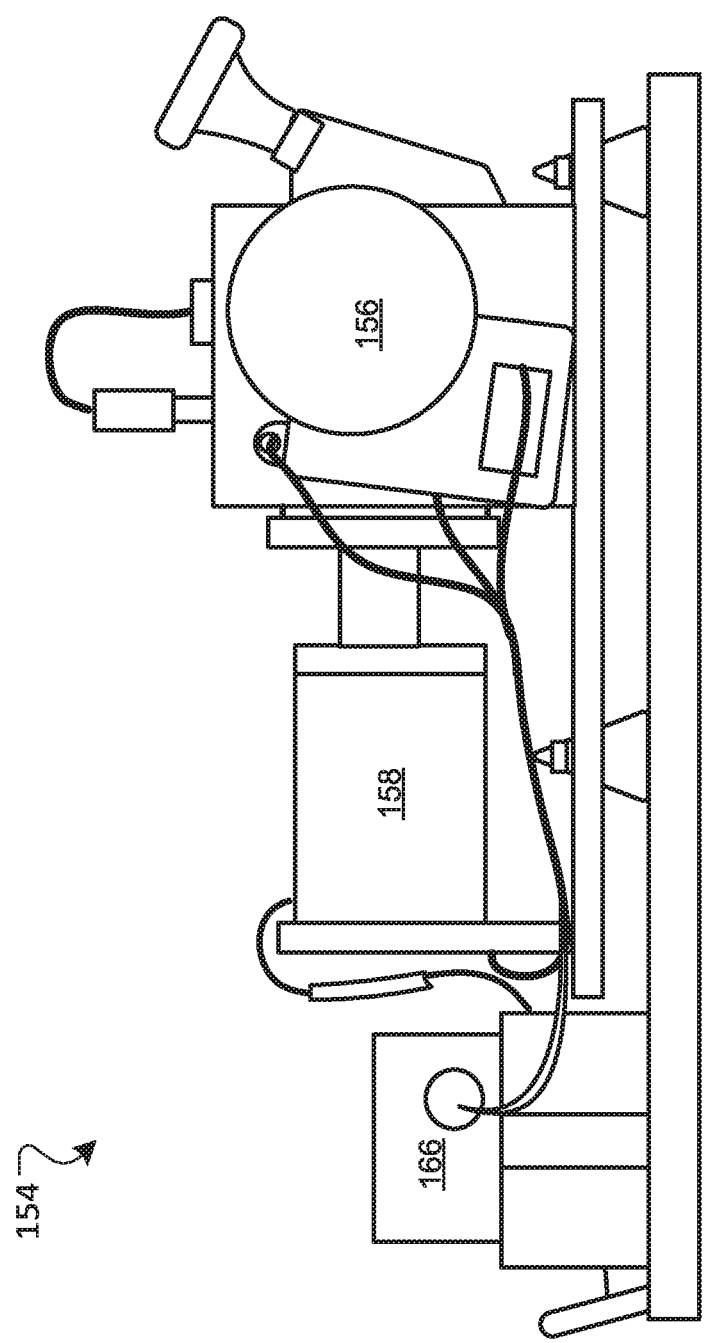

Referring to FIG. 9, in glide mode, the UAV can begin its mission at take-off with both the combustion engine and the electric motor(s) of the propulsion system operating. When the UAV reaches a pre-determined higher altitude (shown at point 902 on an altitude plot 900), the engine and electric motors are deactivated, allowing the UAV to glide down to a predetermined lower altitude (shown at point 904). When the UAV reaches the lower altitude, the engine and electric motors are reactivated to propel the UAV back to the higher altitude (shown at point 906).

This process can be repeated until the UAV reaches an area of interest. At the area of interest, the engine and electric motors are deactivated, allowing the UAV to operate completely silently, thus evading noise and heat detection sensors. The UAV can remain over the area of interest in glide mode, e.g., to capture surveillance images or to drop a payload into the area of interest. When the UAV reaches a pre-determined low altitude, the UAV can leave the area of interest. Outside of the area of interest, the engine and electric motors can be reactivated to propel the UAV back to a higher altitude, e.g., to re-enter the area of interest or to return to a base.

In some examples, the UAV can fly to the area of interest with the engine continuously running and/or on battery power, and can operate in glide mode only once the UAV is near the area of interest.

In some examples, while the UAV is gliding with both the engine and the electric motors deactivated, the free-spinning propellers can be used as turbines to charge the batteries. For instance, the spinning of the propellers is transferred to the electric motor as torque, which causes the electric motor to generate electrical energy. The generated electrical energy can be provided to the batteries.

In some examples, the presence of a distributed energy system enables the rotational speed (e.g., rpm) of a propeller of a twin propeller aerial vehicle to be varied to carry out a turn. In some examples, the location of the combustion engine on the aerial vehicle can be quickly changed, e.g., after manufacture of the aerial vehicle, to accommodate different payloads. For instance, the location of the engine can be adjusted to keep the center of gravity of the aerial vehicle (including its payload) fixed. In some examples in which the propeller is mounted on a wing of the aerial vehicle, the wing can be built with less mechanical structure because the electrical motor is lighter than a traditional combustion engine or jet engine.

The UAVs described here can be deployed for weather monitoring or forecasting applications. For example, an NCAR dropsonde containing a UAV can be released into the center of a hurricane by a weather reconnaissance aircraft. The UAV deployed from the NCAR dropsonde can collect weather data from inside the hurricane and transmit the data to a remote destination (e.g., the weather reconnaissance aircraft or another destination) or store the data in an on-board data storage for future recovery. For instance, the UAV can be operated to collect weather data as a function of both vertical altitude and lateral position within the hurricane. Such positional data can be useful for short term forecasting of the particular hurricane and for training existing weather models or creating new weather models for improved weather forecasting capabilities. Further description of a deployable UAV can be found in U.S. patent application Ser. No. 15/593,803, filed May 12, 2017, the entire contents of which are incorporated here by reference.

The UAVs described here can be deployed for sensing applications, such as air quality testing, monitoring or forecasting of forest fires, monitoring of volcanic eruptions, environmental monitoring inside of a region exposed to radioactivity, or other situations in which remote monitoring or measurements can be useful. In some examples, the UAVs can collect data, such as environmental measurements, still or video images, or other data, and store the data in an on-board data storage. Later, when the UAV is recovered or returns to a base station, the data can be retrieved from the on-board data storage. In some examples, the UAVs can transmit the collected data, e.g., in real time or in batches, to a destination, such as a remote server (e.g., on the aircraft from which the UAV was released), a satellite, or another destination. Further description of the use of UAVs for data collection, storage, and/or transmission can be found in U.S. patent application Ser. No. 15/594,255, filed May 12, 2017, the entire contents of which are incorporated here by reference, The UAVs described here can be used for security applications, such as for governmental surveillance of enemy territory, security surveillance of territory that is closed to human entry (e.g., radioactive waste disposal sites), or other security applications. The UAVs described here can be used for military applications, such as for reconnaissance in advance of troop movements, delivery of computing capability (e.g., data storage capability, data processing capability, communications capability, or other computing capabilities) to troops deployed in remote (e.g., wilderness) areas, or other military applications.

Other embodiments are within the scope of the following claims.

We claim:
1. An aerial vehicle comprising:
  a hybrid power generation system comprising:
    a combustion engine; and
    a generator mechanically coupled to the combustion engine;
  a plurality of propulsion systems, each propulsion system located remote from the hybrid power generation system, each propulsion system comprising:
    an electric motor electrically coupled to the generator; and
    a rotational mechanism coupled to the electric motor;
  an electronic control unit configured to control operations for the combustion engine; and
  a plurality of electronic speed controllers configured to control operations for the plurality of propulsion systems, respectively, wherein controlling operations of the combustion engine is independent of controlling the plurality of propulsion systems, wherein controlling operations of at least one propulsion system is independent of controlling the remainder of the plurality of propulsion systems, and wherein the combustion engine is controlled to produce a single rotational output that is provided to the mechanically coupled generator.

2. The aerial vehicle of claim 1, wherein the rotational mechanism comprises a propeller.

3. The aerial vehicle of claim 1, wherein the rotational mechanism comprises a fan.

4. The aerial vehicle of claim 1, wherein the generator is configured to convert mechanical energy from the engine into electrical energy.

5. The aerial vehicle of claim 4, wherein the electric motor is configured to convert the electrical energy from the generator into rotational mechanical energy.

6. The aerial vehicle of claim 5, wherein the rotational mechanism is configured to be driven by the rotational mechanical energy from the electric motor.

7. The aerial vehicle of claim 1, wherein one or more of the plurality of propulsion system is located on a wing of the aerial vehicle and the hybrid power generation system is located on a body of the aerial vehicle.

8. The aerial vehicle of claim 1, each of the plurality of propulsion systems comprising: an electric motor electrically coupled to the generator; and a rotational mechanism coupled to the electric motor.

9. The aerial vehicle of claim 8, wherein each electric motor is configured to operate independently of each other electric motor.

10. The aerial vehicle of claim 1, comprising a battery electrically coupled to the generator and to the electric motor.

11. The aerial vehicle of claim 1, comprising one or more of a sensing subsystem, a computing subsystem, and a communications subsystem electrically coupled to the generator.

12. A method comprising:
in a hybrid power generation system of an aerial vehicle:
generating mechanical energy in a combustion engine; and
converting the generated mechanical energy into electrical energy in a generator mechanically coupled to the combustion engine;
at an electronic control unit, controlling operations of the combustion engine such that the combustion engine operates to produce a single rotational output that is provided to the mechanically coupled generator;
at each of a plurality of electronic speed controllers, controlling operations of at least one of a plurality of propulsion systems, respectively;
at the plurality of propulsion systems of the aerial vehicle, each propulsion system located remote from the hybrid power generation system:
converting the electrical energy into rotational mechanical energy to drive rotation of a rotational mechanism of each propulsion system;
driving rotation of the rotational mechanism in each propulsion system independently of the rotation of the rotational mechanism in each other propulsion system,
wherein controlling operations of the combustion engine at the electronic control unit is independent of controlling the plurality of propulsion systems, and
wherein controlling operations of the plurality of propulsion systems is independent of controlling operations of the combustion engine.

13. The method of claim 12, comprising driving rotation of a first rotational mechanism in a first direction and driving rotation of a second rotational mechanism in a second direction, the first direction different from the second direction.

14. The method of claim 12, comprising driving rotation of a first rotational mechanism at a first speed and driving rotation of a second rotational mechanism at a second speed, the first speed different from the second speed.

15. The method of claim 12, comprising storing at least some of the electrical energy in a battery.

16. The method of claim 12, comprising providing at least some of the electrical energy to one or more of a sensing subsystem, a computing subsystem, and a communications subsystem.

* * * * *